United States Patent
Miyamoto et al.

(10) Patent No.: US 9,286,929 B2
(45) Date of Patent: Mar. 15, 2016

(54) MULTILAYERED OPTICAL DISK AND ITS RECORDING METHOD

(75) Inventors: Harukazu Miyamoto, Higashimurayama (JP); Koichi Watanabe, Hachioji (JP); Yutaka Nagai, Yokohama (JP); Koichiro Nishimura, Yokohama (JP); Takakiyo Yasukawa, Fujisawa (JP)

(73) Assignee: HITACHI CONSUMER ELECTRONICS CO., LTD., Tokyo (JP)

( * ) Notice: Subject to any disclaimer, the term of this patent is extended or adjusted under 35 U.S.C. 154(b) by 1181 days.

(21) Appl. No.: 12/570,106

(22) Filed: Sep. 30, 2009

(65) Prior Publication Data

US 2010/0309764 A1  Dec. 9, 2010

(30) Foreign Application Priority Data

Jun. 5, 2009  (JP) ................. 2009-136548
Jul. 6, 2009  (JP) ................. 2009-159535

(51) Int. Cl.
G11B 7/007  (2006.01)
G11B 7/1267  (2012.01)
G11B 7/24038  (2013.01)
G11B 7/00  (2006.01)

(52) U.S. Cl.
CPC .......... *G11B 7/00736* (2013.01); *G11B 7/1267* (2013.01); *G11B 7/24038* (2013.01); *G11B 2007/0013* (2013.01)

(58) Field of Classification Search
CPC ............. G11B 7/00736; G11B 7/1267; G11B 7/24038; G11B 2007/0013
USPC ........... 369/47.53, 53.1, 53.17, 53.2, 94, 283, 369/286
See application file for complete search history.

(56) References Cited

U.S. PATENT DOCUMENTS 5,414,451 A  5/1995  Sugiyama et al.
7,701,820 B2  4/2010  Setono
(Continued)

FOREIGN PATENT DOCUMENTS

CN  1553446 A  12/2004
EP  1 318 509  6/2003
(Continued)

OTHER PUBLICATIONS

DVD+RW/+R, Jan. 22, 2002, Triceps (H9504112 (609910) pp. 2-6.
(Continued)

*Primary Examiner* — Aneeta Yodichkas
(74) *Attorney, Agent, or Firm* — Baker Botts L.L.P.

(57) ABSTRACT

A method for performing recording on a multilayered optical disk which has three or more recordable or rewritable information recording layers with a first recording layer and a second recording layer located nearer to a light incident surface than the first recording layer, and which respectively has a first test area configured by a plurality of segments in the first recording layer and in the second recording layer, wherein a predetermined radial distance L is defined beforehand. When an arbitrary segment in the second test area is test-recorded, a segment in the first test area, the radial distance of which from the recorded test area in the second test area is within the range of the predetermined radial distance L, is set as a segment in which test recording is not performed.

13 Claims, 10 Drawing Sheets

(56) References Cited

U.S. PATENT DOCUMENTS

| | | | |
|---|---|---|---|
| 2002/0136122 A1* | 9/2002 | Nakano | 369/47.53 |
| 2002/0186637 A1* | 12/2002 | Van Woudenberg et al. | 369/59.25 |
| 2003/0185121 A1 | 10/2003 | Narumi et al. | |
| 2004/0139459 A1 | 7/2004 | Mishima et al. | |
| 2004/0179440 A1* | 9/2004 | Yamazaki | 369/44.32 |
| 2004/0264339 A1* | 12/2004 | Miyagawa et al. | 369/94 |
| 2005/0013222 A1* | 1/2005 | Lee et al. | 369/47.51 |
| 2007/0071936 A1* | 3/2007 | Yamanaka et al. | 428/64.4 |
| 2007/0086322 A1* | 4/2007 | Watabe et al. | 369/275.3 |
| 2007/0121449 A1* | 5/2007 | Taniguchi et al. | 369/47.53 |
| 2008/0101209 A1 | 5/2008 | Nagai et al. | |
| 2008/0304391 A1 | 12/2008 | Gushima et al. | |
| 2010/0214896 A1* | 8/2010 | Miyamoto et al. | 369/53.41 |
| 2010/0329097 A1* | 12/2010 | Miyamoto et al. | 369/100 |

FOREIGN PATENT DOCUMENTS

| | | |
|---|---|---|
| EP | 2 037 456 | 3/2009 |
| EP | 2 273 497 | 1/2011 |
| JP | 05-101398 | 4/1993 |
| JP | 2000-293947 | 10/2000 |
| JP | 2002-133667 | 5/2002 |
| JP | 2003-109217 | 4/2003 |
| JP | 2004-327038 | 11/2004 |
| JP | 2005-038584 | 2/2005 |
| JP | 2008-192258 | 8/2008 |
| WO | WO 02/23542 | 3/2002 |

OTHER PUBLICATIONS

DVD+RW/+R, Jan. 22, 2002, Triceps (H9504112 (609910) pp. 110-113.

U.S. Office Action dated Oct. 9, 2012 in connection with U.S. Appl. No. 13/230,290.

* cited by examiner

FIG. 14    (PRIOR ART)
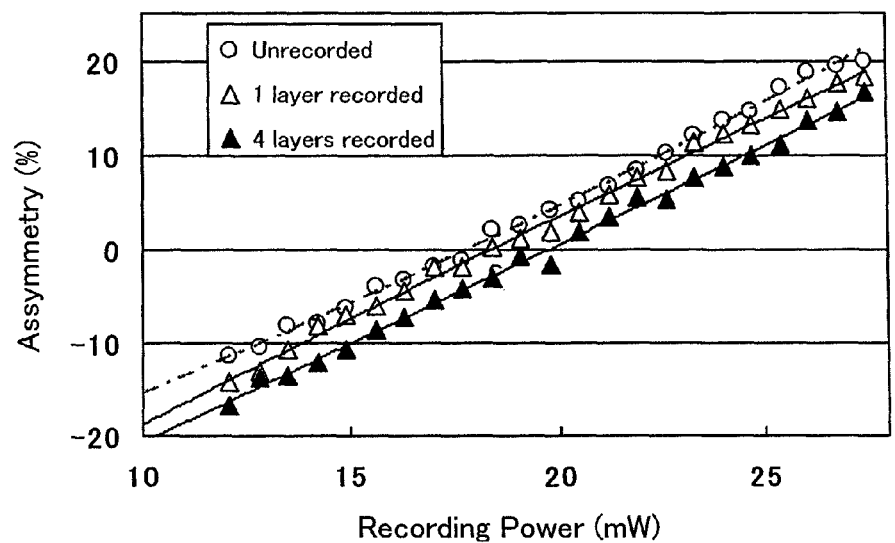
FIG. 15
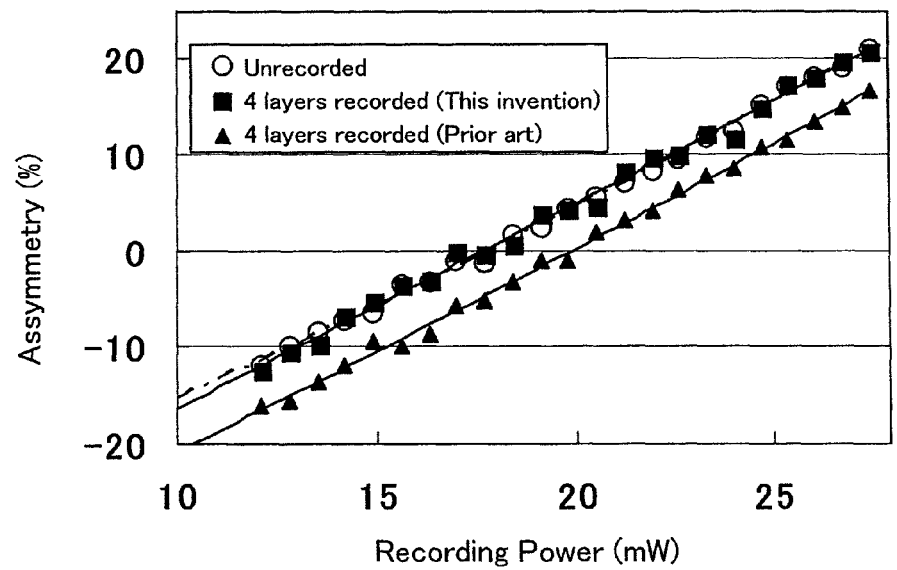

MULTILAYERED OPTICAL DISK AND ITS RECORDING METHOD

CLAIM OF PRIORITY

The present application claims priority from Japanese patent applications JP 2009-136548 filed on Jun. 5, 2009 and JP 2009-159535 filed on Jul. 6, 2009, the contents of which are hereby incorporated by reference into this application.

BACKGROUND OF THE INVENTION

1. Field of the Invention

The present invention relates to an optical disk having a plurality of recording layers, and a recording method of an optical disk having a plurality of recording layers.

2. Background Art

FIG. 2 schematically shows a cross-sectional structure of a conventional multilayered optical disk, and a principle of selectively reading/writing information from/to each of the recording layers. In the present prior art form, the recording medium includes a total of five recording layers (the first recording layer 411, the second recording layer 412, the third recording layer 413, the fourth recording layer 414, and the fifth recording layer 415). When the five-layer recording medium is used, in order to access recorded information on the second recording layer 412, the position of an optical spot 32 is positioned on the second recording layer 412 by controlling the position of an objective lens 30. In this case, convergent light 31 during the course of being focused by the objective lens is transmitted through the first semitransparent recording layer 411. However, the beam diameter of the convergent light 31 on the first recording layer is sufficiently large as compared with the diameter of the optical spot 32 on the second recording layer 412, and hence the recorded information on the first semitransparent recording layer 411 cannot be decomposed and reproduced. The beam diameter is large on the first semitransparent recording layer 411, and hence the light intensity per unit area is relatively small. Therefore, there is no possibility that the information on the first recording layer 411 is destroyed at the time of recording. In this way, reading/writing of information from/to the second recording layer formed farther than the first recording layer is realized without being influenced by the first recording layer.

Similarly, when reading/writing of information from/to the fifth recording layer 415 is performed, the position of the optical spot 32 is positioned on the fifth recording layer 415 by controlling the position of the objective lens 30. Here, in the case where the interlayer spacing is set as d, where the numerical aperture of the objective lens is set as NA, where the wavelength of light is set as $\lambda$, and where the refractive index of the interlayer transparent layer is set as n, the beam diameter on the layer adjacent to the reading/writing target layer is given by $2 \times d \times (NA/n)/(1-(NA/n)^2)^{1/2}$. For example, in the case where d is 8 μm, and where NA is 0.85, the beam diameter becomes about 10 μm. Thus, in the case where the wavelength $\lambda$ is 400 nm, the light beam on the adjacent layer has a diameter more than 20 times as large as the diameter ($\lambda$/NA=470 nm) of the optical spot 32 on the targeting layer, and hence has an area more than 400 times as large as the area of the optical spot 32. The details of the conditions, under which reading/writing is performed in this way from/to an optical recording medium having a plurality of recording layers without the influence of the other layers, are described in Patent Publication (Kokai) No. 5-101398 (patent document 1).

In such a multilayered optical disk, in the case where information is recorded on a farther layer as viewed from the light incident side, there is a problem that the laser power reaching the farther layer is different due to the difference in the effective transmittance of the nearer layer between the case where the information is recorded on the farther layer through an unrecorded area on the nearer layer and the case where the information is recorded on the farther layer through a recorded area on the nearer layer. This problem is schematically shown in FIG. 5. FIG. 5A shows a state where an optical spot is focused on the n-th recording layer (the n-th layer). FIG. 5B shows a state of an optical beam transmitted through a recording layer (the m-th layer) on the nearer side than the n-th layer in the case where the optical spot is focused on the n-th layer. The vertical lines in the figure represent recording tracks formed on the m-th layer. An area 431 means an area (unrecorded area) where no information is recorded, while an area 432 means an area (recorded area) where certain information is recorded. In the case of a Blu-ray Disc, the track pitch is 0.32 μm, and hence the light made incident on the m-th layer is transmitted through the m-th layer by being spread in a range including about 100 tracks, which also depends on the distance from the n-th layer. The transmittance is different between the recorded area and the unrecorded area. Thus, even in the case where the same optical beam is transmitted, the amount of transmitted light is different between the case where the optical beam is transmitted through the recorded area and the case where the optical beam is transmitted through the unrecorded area. That is, the effective transmittance of the m-th layer is changed by the area ratio between the recorded area and the unrecorded area which exist in the m-th layer.

In JP Patent Publication (Kokai) No. 2003-109217 (patent document 2), in order to cope with this problem, a recording medium is configured such that the difference in the transmittance between the unrecorded portion and the recorded portion of the nearer layer is set to a constant value or less, so that recording can be performed on the farther layer by constant recording power independently of the recording states of the nearer layer.

As described in JP Patent Publication (Kokai) No. 2003-109217, in the case where the optical design of the nearer side layer (the m-th layer) is performed, it is preferred to perform the design so that the transmittance is not changed between the unrecorded area and the recorded area. However, the transmittance difference of several % to about 10% between the unrecorded area 431 and the recorded area 432 is normally caused due to various factors including variation in manufacture of the medium, a design error, and the like. Further, even when the transmittance of the nearer layer can be made the same between the unrecorded area and the recorded area, the reflectance is different between the unrecorded area and the recorded area, and hence the reproduced signal quality of the farther layer may be changed by the influence of the reflected beam from the nearer layer.

Therefore, in an actual medium, a slight difference exists in the transmittance between the unrecorded area 431 and the recorded area 432. Thus, as shown in FIG. 5, the laser power reaching the farther side n-th layer is different due to the difference in the effective transmittance of the m-th layer between the case where the recording is performed on the farther side n-th layer through the unrecorded area 431 of the nearer side m-th layer, and the case where the recording is performed on the farther side n-th layer through the recorded area 432 of the nearer side m-th layer. More precisely, when an optical spot 321 is focused on the farther side n-th layer, the effective transmittance of the nearer side m-th layer is not changed in a binary manner in dependence upon whether or not the nearer side m-th layer is recorded, but is continuously changed in correspondence with the area ratio between the unrecorded portion and the recorded portion of an optical beam 322 on the nearer side m-th layer.

There will be described below an example of the influence of this phenomenon on the recording condition learning. FIG. 3 shows relationships between recording power and jitter at the time when reading/writing is performed from/to a farther side L0 layer in a two-layer recordable type optical disk in respective cases where the nearer side L1 layer is not recorded and where the nearer side L1 layer is recorded. A limit equalizer normally used for a Blu-ray Disc is applied as a signal processing method at the time of evaluating the reproduced signal, and the signal is represented as the magnitude of the signal jitter value. According to the measurement, it was found that when all the area of the nearer side L1 layer is not recorded, the optimum recording power, that is, the recording power at which the jitter is minimized is 7.1 mW, and the jitter at this time is 6.7%. On the other hand, it was also found that when all the area of the nearer side L1 layer is recorded, the optimum recording power is 7.5 mW. That is, the optimum recording power in the case where the L1 layer is recorded is shifted by about 7% to the higher power side as compared with the case where the L1 layer is not recorded. If in the case where the L1 layer is recorded, the recording is performed by using the recording power of 7.1 mW which is the optimum power in the case where the L1 layer is not recorded, the jitter becomes 7.0%, and hence is increased by 0.3% as compared with the case where the optimum recording power is used.

This result has, for example, the following meaning. It is assumed that when recording condition learning is performed for the L0 layer, the portion on the L1 layer, through which portion the laser beam is transmitted, is not recorded, and that the optimum recording power determined in this state is used to perform recording on the entire L0 layer. Then, the recording can be performed with no problem in the case where the portion on the L1 layer, through which portion the laser beam is transmitted, is not recorded. However, in the case where the portion on the L1 layer, through which portion the laser beam is transmitted, is recorded, the jitter of the signal reproduced from data recorded on the L0 layer is increased. That is, the margin of the effective recording power is reduced. Therefore, in the method described in patent document 2, the margin of the effective recording power is reduced, and hence it is difficult to perform the recording with high reliability on the entire farther layer by using constant recording power.

In the prior art forms which are proposed to avoid this problem in patent document 3 (JP Patent Publication (Kokai) No. 2005-038584) and patent document 4 (JP Patent Publication (Kokai) No. 2004-327038), multilayer areas for optimum power control are configured so as not to overlap each other so that the power control is always performed in the state where the nearer side layer is not recorded. Further, in patent document 5 (JP Patent Publication (Kokai) No. 2008-192258), the problem of error in the learning of recording power is avoided by a method in which the recording power is learned in both the case where the other layer is recorded, and the case where the other layer is not recorded, and in which the results of the learning are averaged.

Patent document 1: JP Patent Publication (Kokai) No. 5-101398 (U.S. Pat. No. 5,414,451)

Patent document 2: JP Patent Publication (Kokai) No. 2003-109217

Patent document 3: JP Patent Publication (Kokai) No. 2005-038584 (U.S. Patent Application Publication No. 2004/0264339)

Patent document 4: JP Patent Publication (Kokai) No. 2004-327038

Patent document 5: JP Patent Publication (Kokai) No. 2008-192258

SUMMARY OF THE INVENTION

However, in the above described method which is described in patent document 3 and patent document 4 and in which the radial positions of test areas used for the optimum power control in the plurality of recording layers are set to be different from each other, there are the following problems in the case where the method is applied to a multilayered optical disk having three or more recording layers. In a multilayered disk, the tracks of respective layers are radially run out due to an overlap error caused during manufacture. Further, the radius itself has a certain amount of error caused by the thermal shrinkage and expansion of a substrate and a stamper at the time of manufacture. When test areas are arranged at N different radial positions in a N-layer medium, the area as expressed by $(2d+2\Delta+A)\times(N-1)$ needs to be secured as a margin in consideration of the radial run-out component d, the radial error component $\Delta$ due to thermal deformation, and the like, and further in consideration of a spot size expansion component A in the other layer. In the case of a Blu-ray Disc, typical values of the components of d, $\Delta$ and A are approximately set to 37.5 µm, 50 µm, and 25 µm, respectively. Thus, for example, in the case of a four-layer optical disk, it is necessary to secure a radial distance of $(2\times37.4+2\times50+25)\times(4-1)=600$ µm. Further, when a test area of 250 µm is secured for each of the layers, it is necessary to secure a radial distance as large as 600 µm+4×250 µm=2.675 mm for OPC. This results in a problem that the user data area is reduced by the amount corresponding to the secured radial distance.

In the method of patent document 5 in which recording power is learned in both the case where the nearer layer is recorded, and the case where the nearer layer is not recorded, when the method is applied to an optical disk having three or more recording layers, the number of combination of the recorded and unrecorded portions is exponentially increased in correspondence with the number of layers. This results in problems that the learning time is increased, and that substantial user data capacity is reduced in order to secure both the recorded and unrecorded areas.

An object of the invention is to provide a recording method for securing sufficient test areas in a multilayered optical disk having three or more recording layers, without reducing user data areas.

The following means are used in order to achieve the object of the present invention.

(1) There is used a method for performing test recording by using an optical disk which has three or more rewritable or recordable information recording layers, which has, among the plurality of information recording layers, at least a first recording layer and a second recording layer located on the side nearer to the light incident surface than the first recording layer, and which respectively has a first test area configured by a plurality of segments in the first recording layer, and a second test area configured by a plurality of segments in the second recording layer, the method being featured in that a predetermined radial distance L is determined beforehand, and that when an arbitrary segment in the second test area is recorded, the segment in the first test area, the radial distance of which from the recorded test area in the second test area is within the range of the predetermined radial distance L, is set as a segment in which the test recording is not performed.

In the case where after the test recording is performed on the second layer, recording is performed on the first layer which is separated from the second layer by the interlayer spacing d and which is located on the farther side from the light incident surface, the area on the first recording layer, which area is located within the range of the predetermined radial distance L from the recorded area is influenced by the presence of recording in the second recording layer, but it is possible to avoid the influence by the present method. The radial distance L, within the range of which the presence of recording in a certain layer may affect the recording characteristic of the other layer, is determined by the relative radial position error caused by an error in manufacture of the disk, and by the size of the optical spot. Therefore, by configuring such that the test recording, such as the optimum power control, is not performed by using a test recording block within the range of the radial distance L on the first recording layer, it is possible to perform the test recording in the test area on the first recording layer without receiving the influence of recording in the test area on the second recording layer which is located on the side nearer to the light incident surface.

(2) The determination on whether or not the radial distance from the recorded test area on the second recording layer is within the range of the predetermined radial distance L is performed by comparing the addresses of the segments.

Whether or not a test area of an arbitrary address is recorded can be easily known by accessing the address by the drive and checking the signal level, and hence it is possible to easily discriminate the range of the disk radial distance of the area which can be recorded.

(3) The range of the predetermined radial distance L is determined as a distance corresponding to the sum of the relative error of radial positions of the plurality of layers, the radial run-out of the plurality of layers, and the optical beam diameter.

Thereby, it is possible to surely avoid the influence of the presence of recording in the other layer.

(4) The segment is formed by substantially bisecting each of the first recording area and the second recording area.

Thereby, the classification of the recording areas is suppressed to be minimized, and hence the processing by the drive is simplified.

(5) The size of the segment is set equal to a recording unit block size.

Thereby, it is possible to use the test area with as least waste as possible.

(6) In at least a part of the segment in which the test recording is not performed, there is recorded dummy information indicating that the segment is the unusable area.

Thereby, it is not necessary to perform the determination of the unusable area.

(7) Information used to determine whether or not each of the segments of the first test area can be used is recorded in a specific area.

Thereby, it is possible to easily determine the unusable area.

(8) There is used an optical disk which has three or more rewritable or recordable information recording layers, which has, among the plurality of information recording layers, at least a first recording layer and a second recording layer located on the side nearer to the light incident surface than the first recording layer, and which respectively has a first test area configured by a plurality of segments in the first recording layer, and a second test area configured by a plurality of segments in the second recording layer, the optical disk being featured by including a specific area in which there is recorded information used to determine whether or not each of the segments of the first test area can be used.

Thereby, it is possible to secure a sufficient amount of test areas without reducing the substantial recording capacity of the optical disk having the plurality of recording layers.

(9) There is used a method for performing test recording by using an optical disk which has three or more rewritable or recordable information recording layers, which has, among the plurality of information recording layers, at least a first recording layer and a second recording layer located on the side nearer to the light incident surface than the first recording layer, and which respectively has a first test area configured by a plurality of recording unit blocks (RUB) on the first recording layer and a second test area configured by a plurality of recording unit blocks (RUB) on the second recording layer, the method being featured in that a radial distance L is defined, and that when an arbitrary recording unit block (RUB) in the second test area is test-recorded, the recording unit block (RUB) in the first test area, the radial distance of which from the recorded test area in the second test area is within the range of the predetermined radial distance L, is set as a recording unit block (RUB) in which the test recording is not performed.

In the case where after the test recording is performed on the second layer, recording is performed on the first layer which is separated from the second layer by the interlayer spacing d and which is located on the farther side from the light incident surface, the area on the first recording layer, which area is located within the range of the fixed radial distance L from the recorded area, is influenced by the presence of recording in the second recording layer. However, it is possible to avoid the influence by the present method. The range of the radial distance L, in which range the presence of recording in a certain layer may affect the recording characteristic of the other layer, is determined by the relative radial position error caused by an error in manufacture of the disk, and by the size of the optical spot. Therefore, by configuring such that the test recording, such as the optimum power control, is not performed by using the test recording block within the range of the radial distance L on the first recording layer, it is possible to perform the test recording in the test area on the first recording layer without receiving the influence of recording in the test area on the second recording layer which is located on the side nearer to the light incident surface.

(10) The radial distance L is determined as a distance corresponding to the sum of the relative error of radial positions between the plurality of layers, the relative run-out between the plurality of layers, and the optical beam diameter on the layers other than the reading/writing target layer.

Thereby, it is possible to surely avoid the influence of recording in the other layer.

(11) In this case, values defined by a predetermined range of physical specifications of the disk are used as the values of the relative error of radial positions between the plurality of layers, the relative run-out between the plurality of layers, and the optical beam diameter on the layers other than the reading/writing target layer.

In this way, by determining the radial distance L on the basis of the range of physical specifications of the disk, the same recording control can be easily performed independently of the drive which actually performs the reading/writing operation, and hence the interchangeability is improved.

When the radial distance L is dynamically determined by using, as the various specification values, values which are detected by the drive actually performing the reading/writing operation, then the areas which cannot be used for the test recording can be suppressed to be minimized, and thereby the test area can be more efficiently used.

According to the present invention, the leaning of recording power can be performed almost without receiving the influence of the difference between the recorded and unrecorded states of the other layer, and hence the accuracy of the learning of recording power can be improved. Further, at this time, the area of respective layers, in which the learning of recording power is performed, can be superposed and arranged substantially at the same radial position, and hence the user data capacity is not reduced. That is, in a multilayered optical disk having three or more recording layers, sufficient test areas can be secured without reducing user data areas, and the recording can be performed by suitably controlling the power of laser beam irradiated onto the respective layers. As a result, it is possible to improve the quality of recording and the reliability of recorded data.

BRIEF DESCRIPTION OF THE DRAWINGS

FIG. 14 is a figure showing recording characteristics in the recording power adjustment area of a conventional five-layer optical disk.

FIG. 15 is a figure showing recording characteristics in the recording power adjustment area of a five-layer optical disk according to the present invention.

DESCRIPTION OF SYMBOLS

Figure 1A:
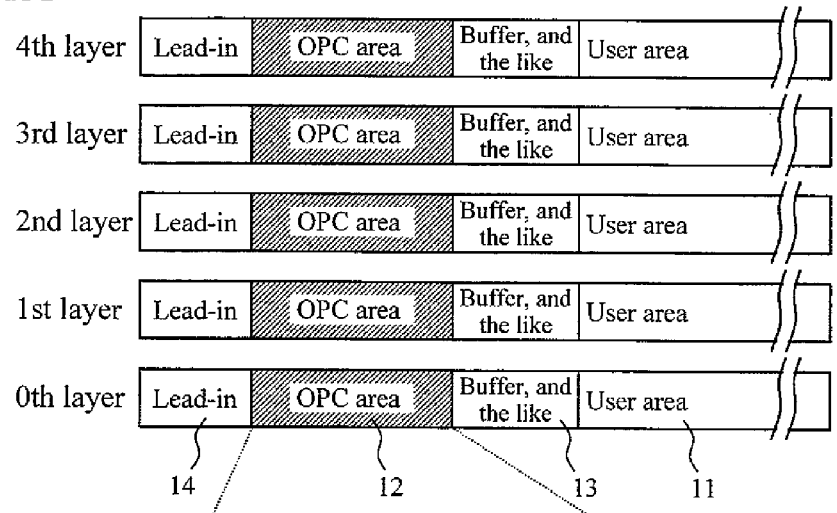
FIGS. 1A-1C are figures showing an arrangement of recording condition adjustment areas of a multilayered optical disk according to the present invention.

1 Recording medium
11 User data area
12 Test area
123 Segment
124 Recording unit block
13 Buffer area, Control area
14 Lead-in area
22 Wobble detector
23 Address detector
24 Demodulator
25 Signal processor
26 Decoder
27 Microprocessor
28 Laser driver
29 Memory
3 Optical head
30 Objective lens
31 Convergent light
32 Optical spot
321 Focused spot
322 Optical beam on a nearer layer
331, 332, 333 Collimator lens
34 Laser
351 Servo-signal detector
352 Signal detector
36 Beam splitter
37 Aberration compensation element
39 Holographic element
411, 412, 413, 414, 415 First, second, third, fourth, fifth recording layer
431 Unrecorded area
432 Recorded area
50 Lens position
51 Lens driving current
52 Focus error signal
53 Total light signal
53 Interlayer spacing
77 Motor
78 Lens actuator
79 Servo circuit

DETAILED DESCRIPTION OF THE PREFERRED EMBODIMENTS

Embodiment 1

Figure 6:
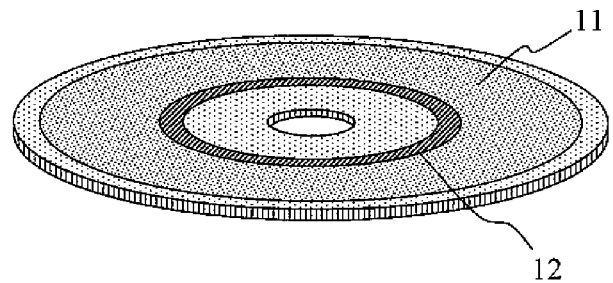
FIG. 6 is a figure showing an arrangement of a test area and a user data area of the optical disk according to the present invention.

FIG. 6 shows an outline of a method for arranging a user data area 11 and a test area 12 used for learning and adjusting reading/writing conditions, such as recording power, in a multilayered optical disk according to the present invention. In the present embodiment, the test area 12 is arranged on the inner periphery side of the user data area 11.

Figure 2:
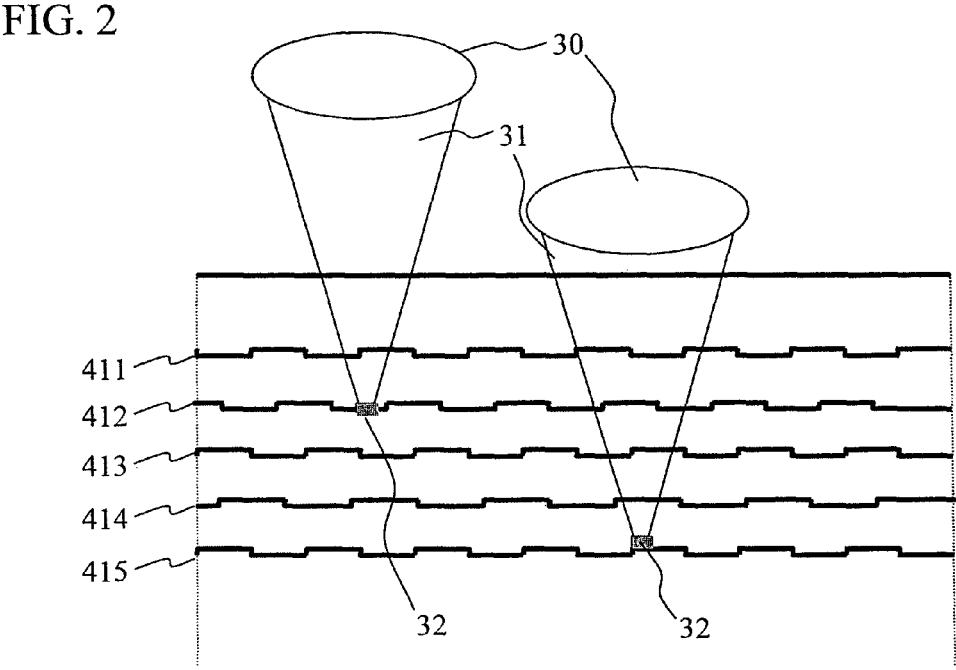
FIG. 2 is a figure showing a structure of the multilayered optical disk and a principle on the basis of which reading/writing is performed independently on the respective layers according to the present invention.
Figure 3:
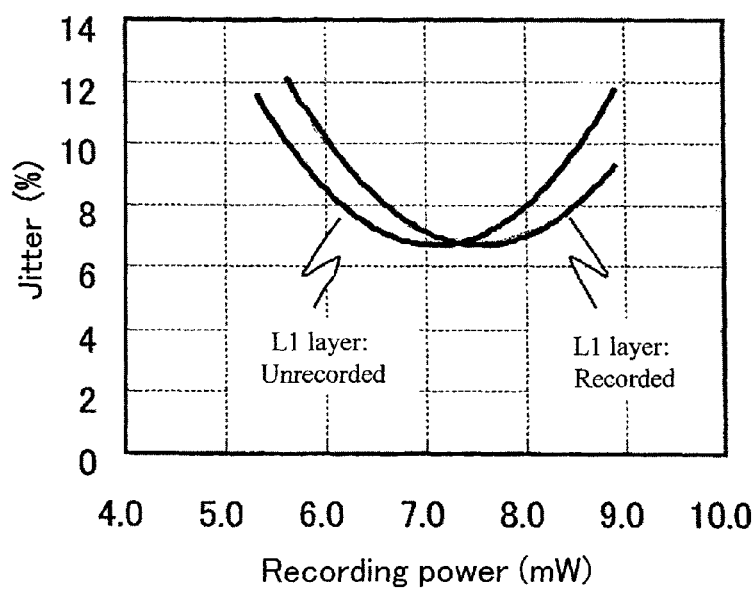
FIG. 3 is a figure for explaining a problem of a conventional multilayered optical disk.

FIG. 1A shows the details of arrangement of respective layers of the multilayered disk (five layers in the present embodiment). FIG. 1A shows a state where there are arranged, in a plurality of layers, the user area 11, and the test area 12, further, a lead-in area 14 used for making an optical head approach the vicinity of the innermost periphery of the disk, and an area 13 which includes a buffer area serving as an interlayer buffer layer and an area in which management information, and the like, are recorded. In FIG. 1A, the left-hand side is the disk inner periphery side, and the right-hand side is the disk outer periphery side. The 0th layer is located on the side farthest from the light incident surface, and the 4th layer is located on the side nearest to the light incident surface. That is, the fifth recording layer 415 in FIG. 2 corresponds to the 0th layer of the present embodiment, and the first recording layer 411 in FIG. 2 corresponds to the 4th layer of the present embodiment. The interlayer spacing between the respective recording layers is changed for each of the layers so that the influence of crosstalk between the layers is minimized, but the minimum value of the interlayer spacing is set to about 11 μm. The test area 12 is referred to as an optimum power control area (OPC area) in the meaning of a learning area used to perform optimum control of recording power in the multilayered disk of the present embodiment. The test areas 12 of the respective layers are located at substantially the same radial positions.

Figure 1B:
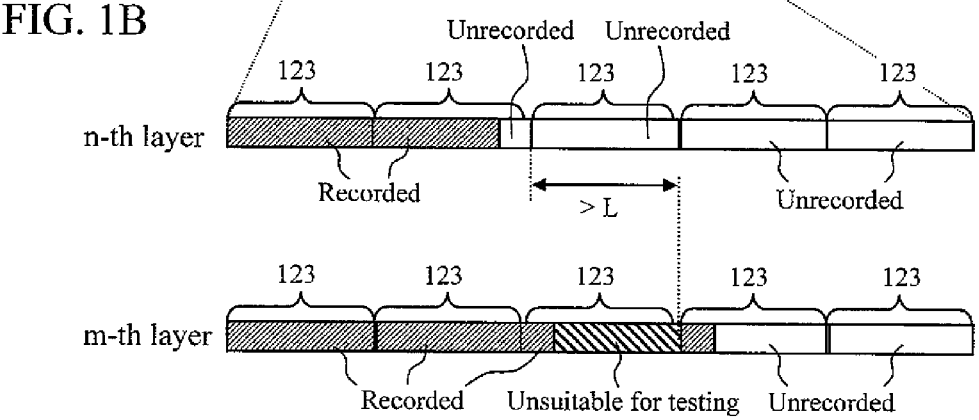

FIG. 1B shows the details in the test area in which a plurality of segments 123 are arranged. Each of the segments 123 is configured by a plurality of recording unit blocks. In FIG. 1B, there mixedly exist segments in which all the areas are recorded, segments in which a part of areas are recorded, and unrecorded segments. In FIG. 1B, the second segment from the left in the layer (n-th layer) nearer to the light incident surface is partially recorded. Thus, the unrecorded area of the segment which is located at the center of the m-th layer and which is within the range of the radial distance L from the recorded segment of the n-th layer is set as an area unsuitable for testing, and the test recording is performed in the second area from the right. In the present embodiment, the radial length of each of the segments is set larger than the radial distance L, within the range of which the presence of recording in a certain layer may affect the recording characteristics of the other layer. The radial distance L is a value obtained in such a manner that the maximum value of the radial tolerance at the time of manufacture of the disk, and the maximum value (75 μm) of the relative run-out between the layers are added to the optical beam diameter at the position separated by an interlayer spacing from the focus position. The areas within the range of the radial distance L may be substantially overlapped with each other in consideration of radial position deviation caused by variation in manufacture of the disk and the expanded amount of the optical beam diameter in the worst case of the radial run-out at the time when the radial position of the optical beam is located on the layer through which the optical beam is transmitted.

Therefore, as in the present embodiment, the segment of the m-th layer (farther layer from the light incident surface) located within the range of the radial distance L from the recorded segment of the n-th layer, that is, the adjacent segment is set as an area unsuitable for testing, so as not to be used for the recording test, such as the optimum power control. Thereby, the accurate learning can be performed without receiving the influence of recording in the layer (the n-th layer) through which the optical beam is transmitted.

Figure 1C:
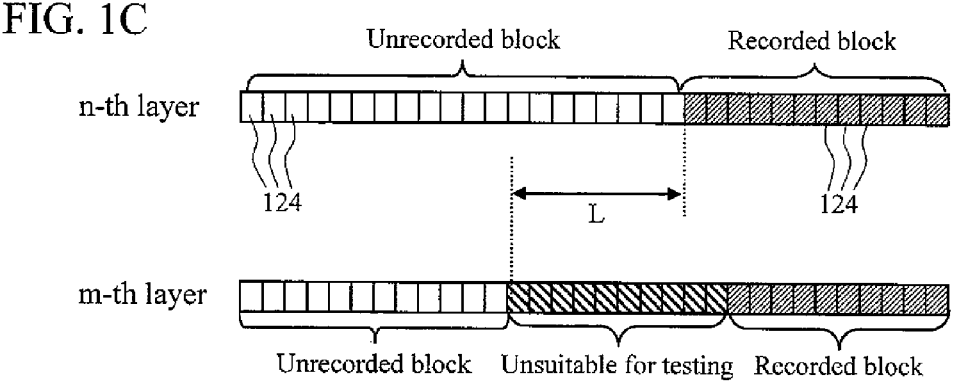

FIG. 1C shows an example of another method of using the test area. In this example, the segment is set to coincide with the minimum recording unit (a recording block or a recording cluster). The recording block is smaller than the range of the radial distance L, and hence a plurality of the recording blocks are positioned within the range of the radial distance L. Therefore, a plurality of the recording blocks are set as blocks unsuitable for testing.

Here, the range of the radial distance L will be described. There is considered a case where after the test recording is performed on the second layer, recording is performed on the first layer which is separated from the second layer by the interlayer spacing d and which is positioned on the farther side from the light incident surface. When the objective lens having NA of 0.85, and the interlayer spacing layer having the refractive index of n=1.6 are used, and when the interlayer spacing d is set to, for example, 30 μm, the beam diameter on the layer separated by the interlayer spacing d is obtained as $[2d \times (NA/n)/\{1-(NA/n)^2\}^{1/2}] \approx 25$ μm. The value (200 μm) obtained by adding the maximum value (100 μm) of the radial tolerance between the layers at the time of manufacture of the disk and the maximum value (75 μm) of the relative run-out between layers to the beam diameter is set as the range of the radial distance L, within the range of which the recording characteristics of the other layer may be influenced. Therefore, by configuring such that the test recording, such as the optimum power control, is not performed by using the test recording block which is located within the range of the radial distance L on the first recording layer, the test recording can be performed on the first recording layer without receiving the influence of recording in the test area of the second recording layer which is positioned on the side nearer to the light incident surface.

The methods for determining a recording block as unsuitable for testing, includes a method in which the determination is performed by comparing a plurality of block addresses between layers, a method in which dummy data are recorded beforehand in the block unsuitable for testing, and a method which stores in a disk management area (TDDS: temporary disk definition structure), and the like, information indicating that the recording block is unsuitable for testing, and the like. From a viewpoint of interchangeability between the drives, it is preferred to combine a plurality of the methods.

Embodiment 2

Figure 4:
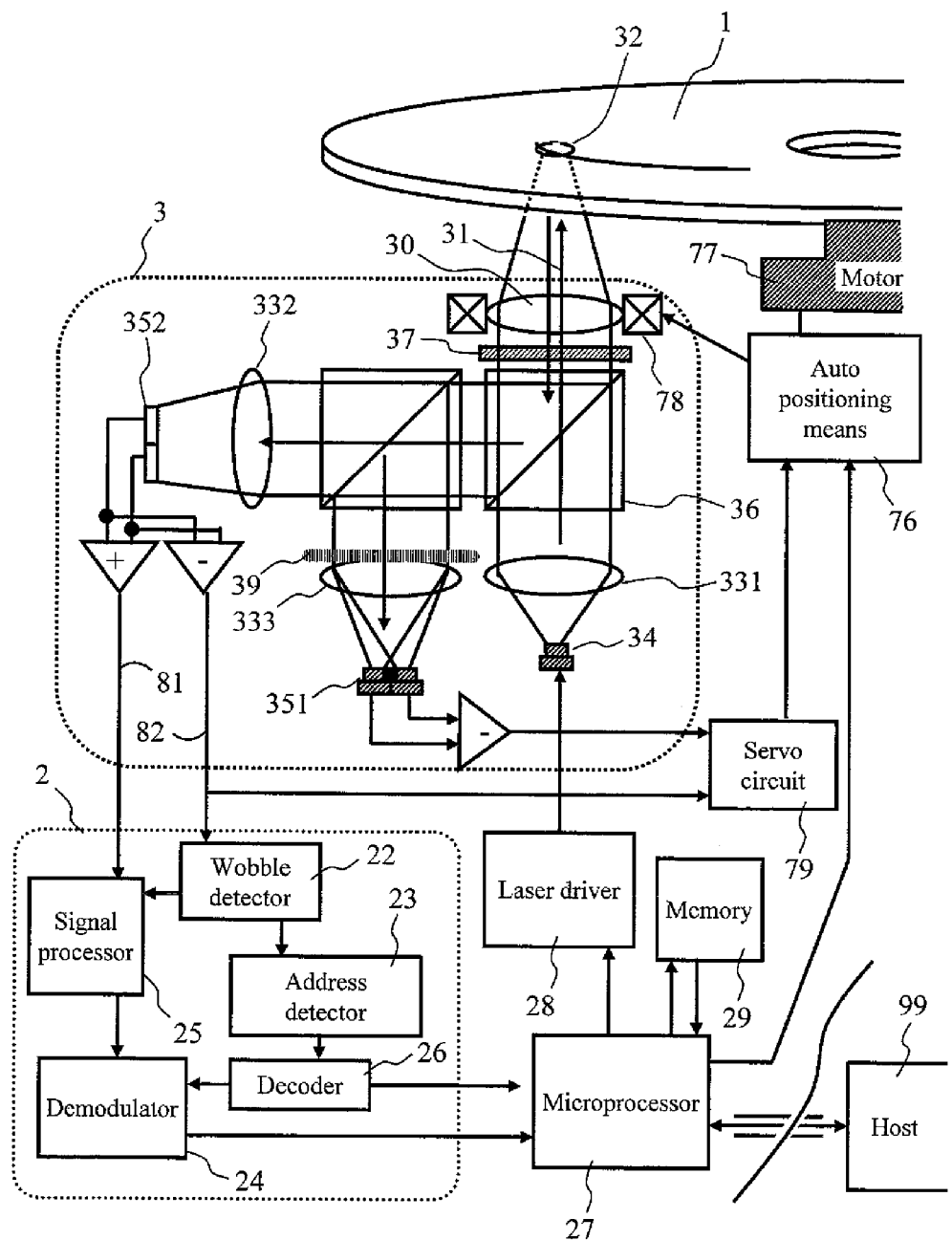
FIG. 4 is a figure showing an example of a reading/writing apparatus of a multilayered optical disk according to the present invention.
Figure 5A:
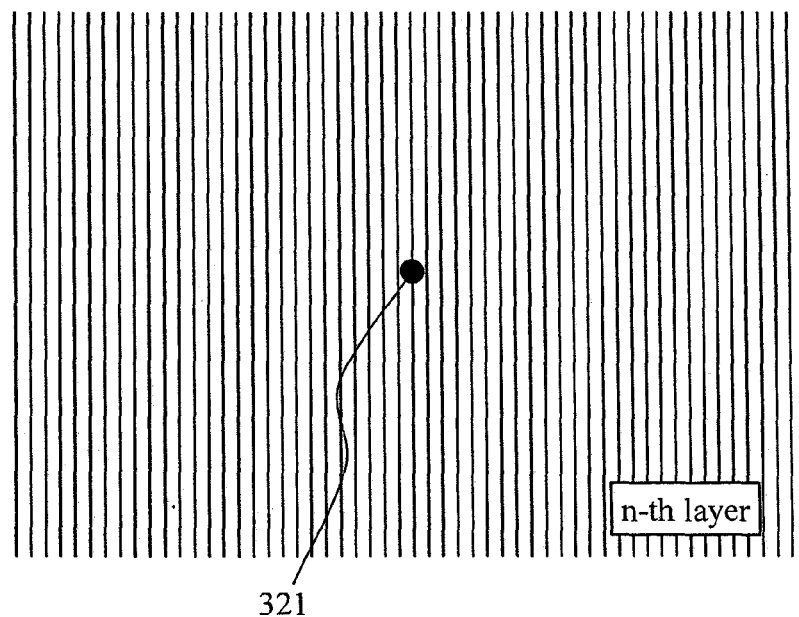
FIGS. 5A and 5B are figures for explaining a problem of the conventional multilayered optical disk.
Figure 5B:
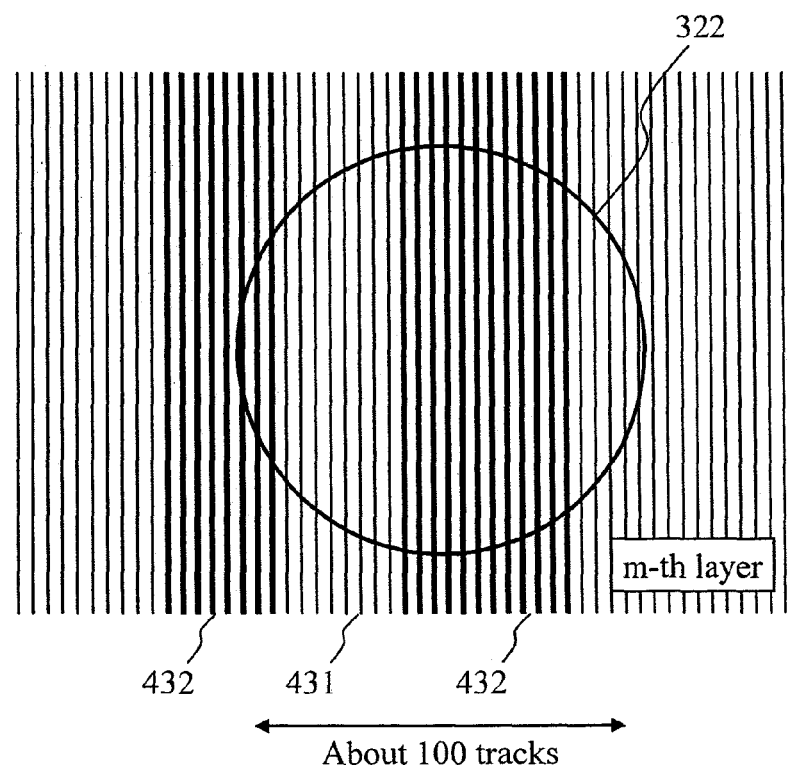

Next, there will be described an example in which various optical disks are evaluated by a reading/writing apparatus shown in FIG. 4. An optical beam emitted from a laser beam source 34 (having a wavelength of about 405 nm in the present embodiment) which is a part of a head 3 is collimated to a substantially parallel optical beam through a collimator lens 331. The collimated optical beam is transmitted through a beam splitter 36, then through an aberration compensation element 37 and an objective lens 30, so as to be irradiated as convergent light 31 on an optical disk 1 so that a spot 32 is formed.

An optical beam reflected from the disk is transmitted through the beam splitter 36, a holographic element 39, and the like, so as to be led to a servo detector 351 and a signal detector 352 by detection lenses 332 and 333. Signals from the respective detectors are subjected to addition and subtraction processing, and thereby are formed into servo signals, such as a tracking error signal and a focus error signal, so as to be inputted into a servo circuit 79. On the basis of the obtained tracking error signal and focus error signal, the servo circuit controls an objective lens actuator 78 and the position of the entire optical head 3 so that the position of the optical spot 32 approaches the position of the target reading/writing area. The addition signal of the detector 352 is inputted into a signal reproduction block 2. The inputted signal is subjected to filtering processing and frequency equalizing processing by a signal processor 25, and thereafter is subjected to digitizing processing. The address information formed in a form, such as a wobble of a groove on the disk, is detected as a differential signal from the division detector 352, and is inputted into a wobble detector 22 in the signal reproduction block 2. The wobble detector 22 has functions of generating a clock synchronized with the wobble signal and discriminating wobble waveforms. The wobble signal detected by the wobble detector 22 is converted into digital information by an address detector 23, and thereafter is subjected to processing, such as error correction, by a decoder 26, so as to be detected as address information. On the basis of the detected address information, a start timing signal of read/write processing, and the like, is generated, so that a demodulator 24 of user data is controlled. At the same time, the address information is also sent to a control circuit (microprocessor) 27, and is used for access processing, and the like.

The method for performing reading/writing from/to a multilayered optical disk by using the optical disk reading/writing apparatus configured as described above is fundamentally the same as the method as described in the related art. For example, when the recording medium having five recording layers shown in embodiment 1 is accessed, the position of the objective lens 30 is controlled so that the position of the optical spot 32 is set on the targeting recording layer (for example, on the second layer). That is, a focused state is formed on the targeting recording layer. In this case, the convergence light in the course of being focused by the objective lens is transmitted through the other semitransparent layers (for example, the fourth layer and the third layer) which are located on the nearer side. However, the beam diameter of the convergent light 31 on the other recording layers is sufficiently large as compared with the diameter of the optical spot 32 on the targeting recording layer, and hence the recorded information on the semitransparent layers cannot be decomposed and reproduced by the convergent light. That is, the information on the targeting layer can be reproduced without receiving the influence of the recorded information of the other layers. Also at the time of recording, on the recording layers other than the targeting layer, the light beam diameter is sufficiently large, so that the light intensity per unit area is reduced to be relatively small. Therefore, there is no possibility that the information on the recording layer other than the targeting recording layer is destroyed. In this way, the reading/writing of information on the multilayered optical disk is realized.

Figure 7:
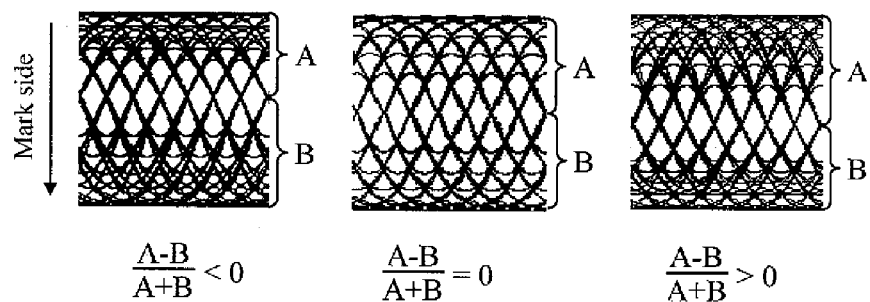
FIG. 7 is a figure for explaining a method for detecting asymmetry which is an index used for the recording power adjustment.
Figure 8:
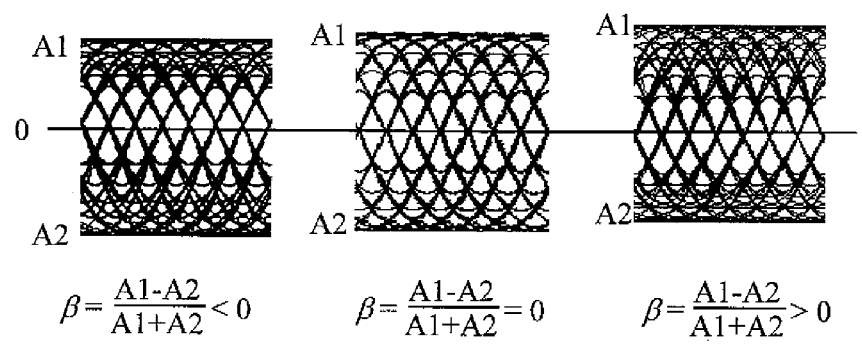
FIG. 8 is a figure for explaining a method for detecting β which is an index used for the recording power adjustment.

The methods for learning the recording power by using such apparatus generally include a method for detecting the signal asymmetry as shown in FIG. 7 and FIG. 8, and a method for evaluating the power dependency of the signal amplitude (modulation amplitude).

FIG. 7 shows a method for measuring an index which is generally referred to as asymmetry, and the amplitude from the center of the eye pattern of signals to the upper and lower envelops of the signals. When the amplitude from the upper side envelop (space side) to the center of the eye pattern is set to A, and when the amplitude from the lower side envelop (mark side) to the center of the eye pattern is set to B, the asymmetry is defined as $(A-B)/(A+B)$, and is changed from a negative value to a positive value as the recording power is increased. The asymmetry under the optimum power recording condition may have a slight offset (several %) in dependence upon the characteristics of the optical disk recording film, but is close to substantially zero. FIG. 8 shows a method for obtaining an evaluation index referred to as β, in which method instead of obtaining the center of the eye pattern, a DC component is removed by using a high-pass filter, and in which method the amplitudes A1 and A2 of the upper and lower envelops are obtained on the basis of the AC coupled zero point, so that the value $\beta=(A1-A2)/(A1+A2)$ is obtained. The two methods are slightly different from each other, but are common in that the optimum power is obtained near the zero point in both the methods. Thus, in many cases, one of the methods is selected and used in dependence upon the circuit configuration of the apparatus. The method for evaluating the power dependency of the signal amplitude (modulation amplitude) is not described here. However, in the method, the DC amplitude is detected, and hence the detection precision tends to be deteriorated in a system, such as a multilayered optical disk, which is easily influenced by leakage light and stray light.

Embodiment 3

Figure 9:
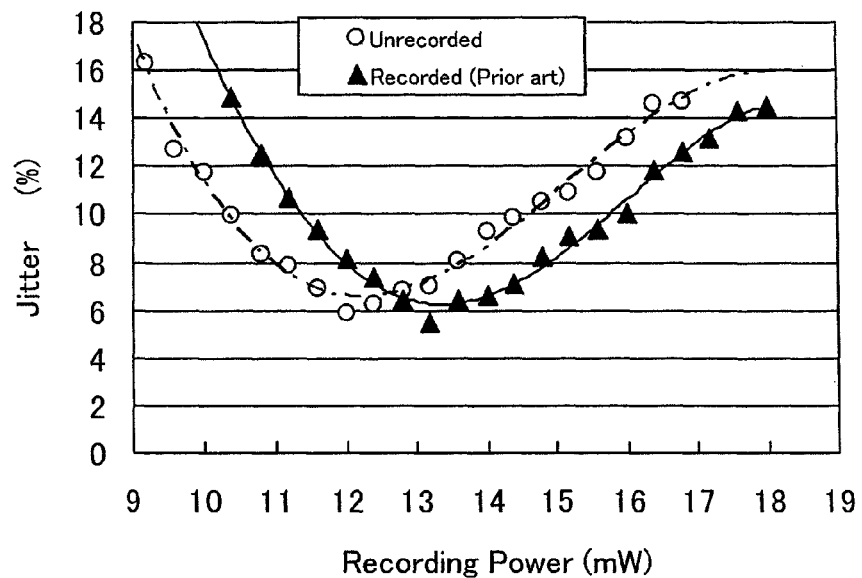
FIG. 9 is a figure showing recording characteristics in the recording power adjustment area of the conventional multilayer optical disk.

FIG. 9 shows an example in which the quality of reproduced signal of a three-layer recordable optical disk is evaluated as the jitter by using the apparatus as described in embodiment 2. In this example, the recording characteristics (recording margin curves) of the targeting farther layer are different between the case where the two layers located on the nearer side are recorded and the case where the two layers located on the nearer side are not recorded. This is not because of the reading characteristics, but because when recording is performed on the farther layer seen from the light incident side in the multilayered optical disk, the laser power reaching the farther layer is made different by the difference in effective transmittance of the nearer layer between the case where the recording is performed to the farther layer through an unrecorded area on the nearer layer and the case where the recording is performed to the farther layer through a recorded area on the nearer layer. That is, the recording characteristics are changed because the effective recording sensitivity is made different so as to change the effective recording power.

Figure 10:
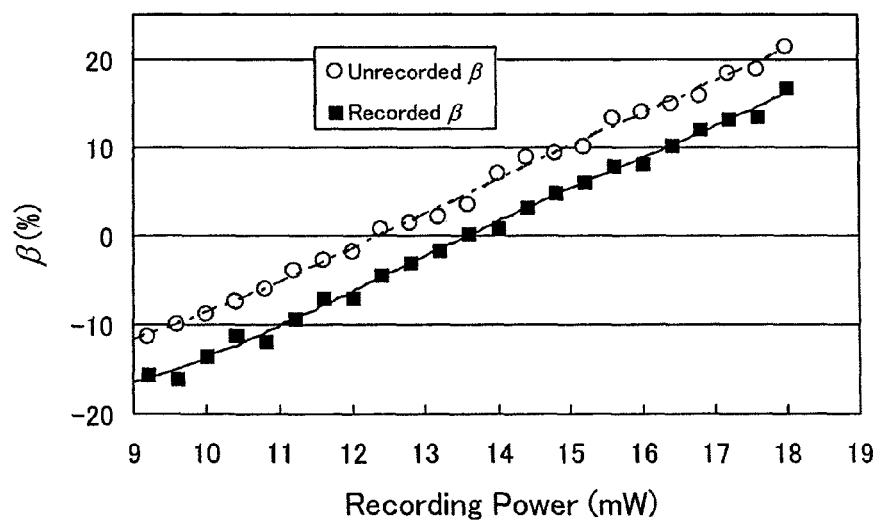
FIG. 10 is a figure showing recording power adjustment results obtained by using the conventional multilayer optical disk.

FIG. 10 shows an example in which the β values of the information recorded in the user data area of the farthest layer (the 0th layer) are evaluated. When the two layers on the nearer side are recorded, the β value is lowered. That is, optimum recording power is shifted to the relatively higher side, so that the effective recording sensitivity is lowered. This change corresponds to at most 10% of the recording power in the optical disk according to the present embodiment.

Figure 11:
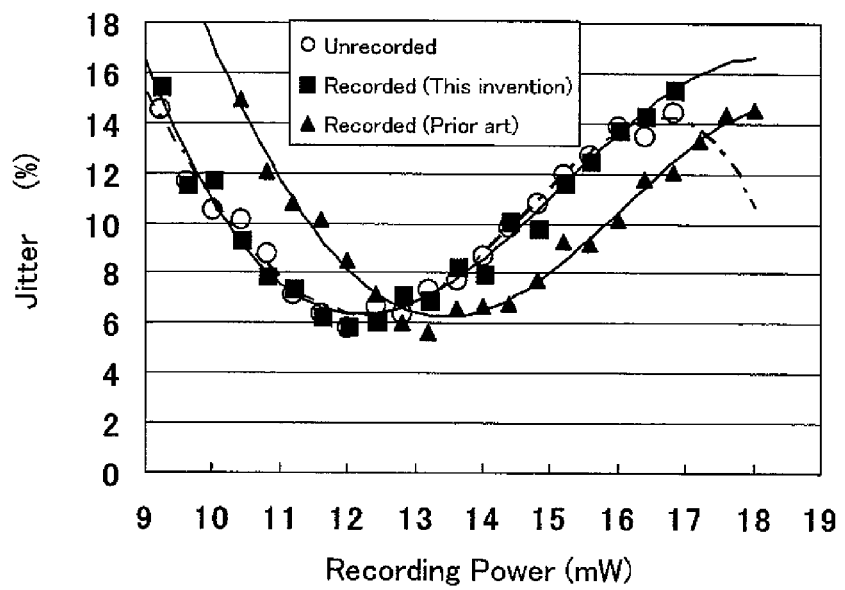
FIG. 11 is a figure showing recording characteristics in the recording power adjustment area of the multilayered optical disk according to the present invention.

FIG. 11 shows recording characteristics (jitter) evaluated in the test area for recording condition adjustment by applying the present invention. From FIG. 11, it can be seen that even after the two nearer layers are recorded, the same recording characteristic is obtained as that in the case where the two, bearer layers are not recorded, and that the test recording without receiving the influence of the difference between the recorded and unrecorded states of the nearer layer is realized.

Figure 12:
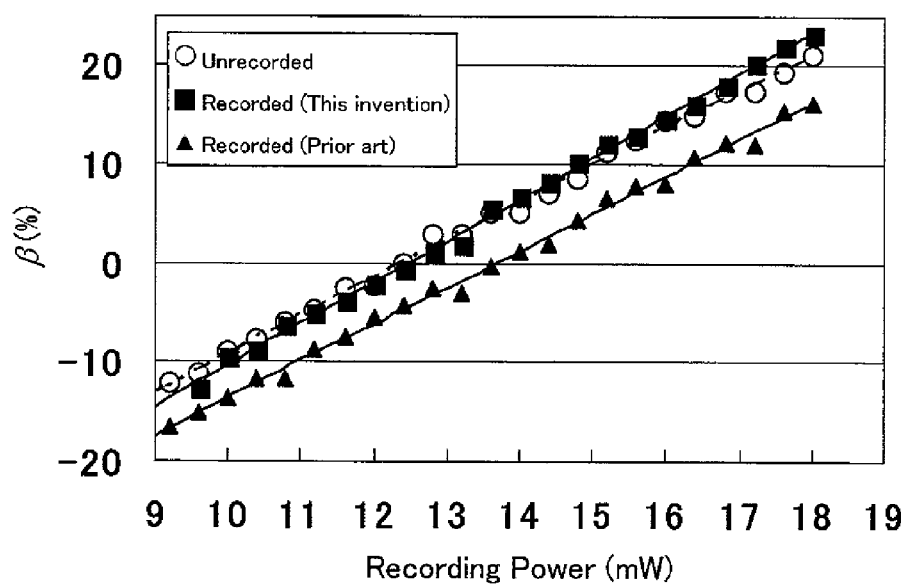
FIG. 12 is a figure showing recording power adjustment results in the recording power adjustment area of the multilayered optical disk according to the present invention.

FIG. 12 shows an example in which the β values are evaluated in the test area for recording condition adjustment by applying the present invention. From FIG. 12, it can be seen that even after the two nearer layers are recorded, the same recording sensitivity characteristic is obtained as that in the case where the two nearer layers are not recorded, and that the recording power is accurately obtained. In the case where recording is actually performed in the user data area, there is used the recording power obtained by increasing by 5% the accurate recording power (12.1 mW) obtained in this way. This is because in the user data area, the recording sensitivity is lowered (optimum power is increased) by at most 10% due to the recording state of the nearer layer, and because when recording is performed with the recording power obtained by increasing by 5% the accurate recording power, the recording can be performed with the power error of 5% or less in both the area with the highest recording sensitivity (in which the two nearer layers are not recorded) and the area with the lowest recording sensitivity (in which the two nearer layers are recorded). That is, when recording is performed by using the power of about 12.7 mW corresponding to near the bottom of any one of the two jitter curves shown in FIG. 10, the recording can be performed with substantially optimum power without receiving the influence of the recording states of the nearer layers.

Figure 13A:
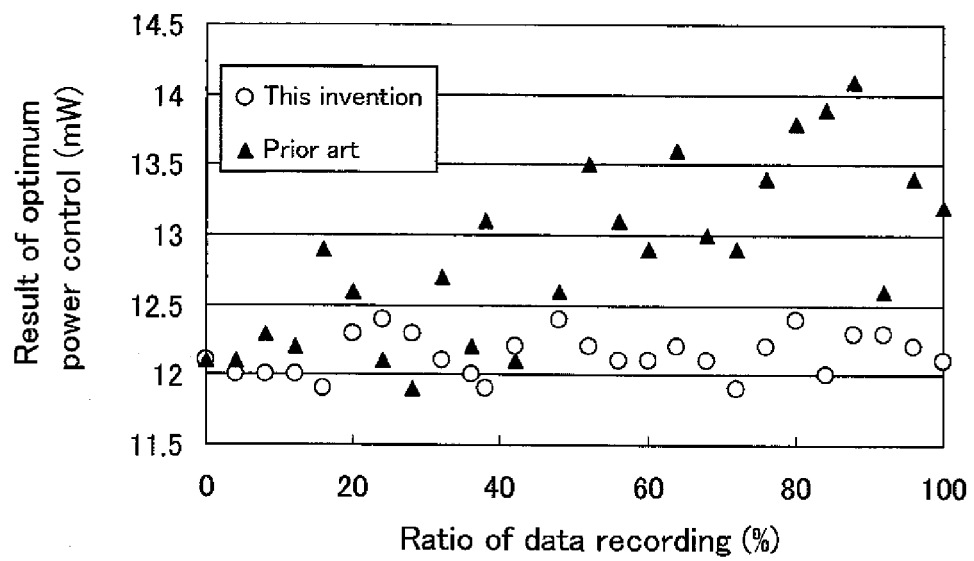
FIGS. 13A and 13B are figures showing effects of the present invention.
Figure 13B:
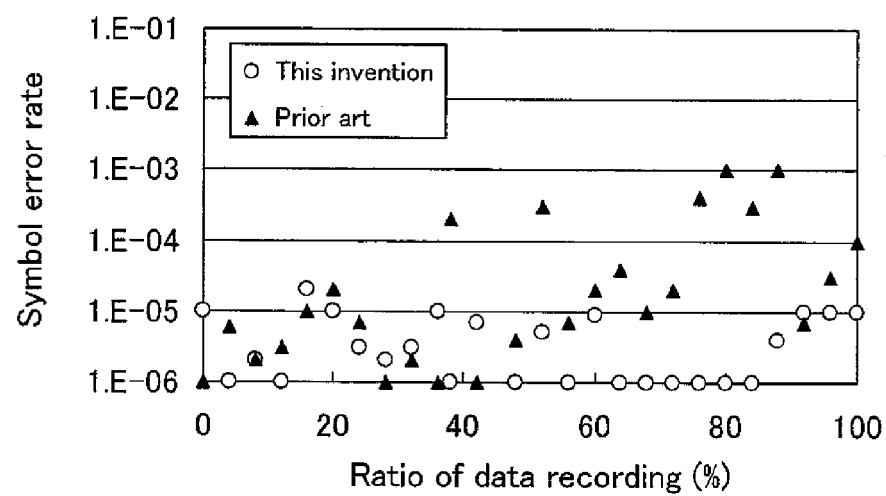

FIG. 13A shows a comparison between a power adjustment result in the case where the recording power adjustment is performed in the test area by using the recordable optical disk according to the present invention, and a power adjustment result in the case of the conventional optical disk recording method. FIG. 13B shows the error ratio of recorded data. The horizontal axis represents the ratio of the recorded area of the user data area. In the two types of disks, recording is performed on a plurality of layers under the same condition and in a substantially random order. Further, the recording power adjustment is forcibly performed by performing the loading and unloading at a fixed interval. In the present invention, the learning results of recording power are substantially fixed independently of the ratio of recorded area. On the other hand, in the prior art form, according to the increase in the ratio of recorded area, the variation in the learning results of recording power is increased, and the recording power is also shifted to the higher power side. That is, this indicates that, in the conventional method, with the progress of the recording, the recording power is not adjusted to the original recording power, but is adjusted to wrong recording power which is shifted to the higher power side.

FIG. 13B shows an example in which the quality of recorded data is evaluated in both the case where the recording is performed by the recording method according to the present invention and the case where the recording is performed by the conventional recording method. The vertical axis represents the symbol error rate. The recording quality is determined as higher in the case of a lower symbol error rate. In the present invention, the error rate is always kept to about $10^{-5}$ or less independently of the ratio of recorded area, so that good recording quality is maintained. On the other hand, in the prior art form, the error rate is increased as the ratio of recorded area is increased. This indicates that the recording quality is lowered in the prior art form because the learning precision of recording power is deteriorated and thereby the recording is performed with excessive recording power.

As described above, according to the present invention, the learning of recording power can be performed without receiving the influence of the difference between the recorded and unrecorded states of the other layer, and hence the learning precision of recording power can be improved. Further, in this case, the recording power learning areas of respective layers can be overlapped with each other at substantially the same radial positions, and hence the user data capacity is not reduced. That is, in the multilayered optical disk having three or more recording layers, sufficient test areas can be secured without the user data area being reduced, and the recording can be performed by suitably controlling power of the laser beam irradiated onto the respective layers, so that the quality of recording and the reliability of recorded data can be improved.

Embodiment 4

FIG. 14 shows an example in which there is evaluated asymmetry of information recorded in the user data area of the farthest layer (the 0-th layer) in the recordable five-layer optical disk described in embodiment 1 by using the apparatus described in embodiment 2. When even at least one of the nearer layers is recorded, the asymmetry is lowered. That is, the optimum recording power is shifted to the higher power side, so that the effective recording sensitivity is lowered. This change is maximized in the case where all of the four nearer layers are recorded, so that the recording power is changed by at most 12%.

FIG. 15 shows results of evaluation of asymmetry in the recording adjustment test area, which is performed by applying the present invention. From FIG. 15, it can be seen that even after the four nearer layers are recorded, there are obtained the recording sensitivity characteristics almost the same as those in the case where the four nearer layers are not recorded, and that the recording power can be accurately obtained.

In the case where the recording is actually performed in the user area by using the obtained recording power, the recording is performed with the recording power set by increasing the obtained optimum recording power by 6%. This is based on the consideration about the fact that as compared with the case where all the nearer layers are not recorded, the necessary recording power is increased by 12% in the case where all the nearer layers are recorded. When the present invention is applied, the recording power, which is obtained by the learning in the test area, is always the same as the recording power in the case where the nearer layers are not recorded. However, in the user data area, the recording power is reduced by at most 12% (optimum power is increased) due to the recording state of the nearer layers. Thus, when the recording is performed with the recording power set by increasing the obtained optimum recording power by about 6%, the recording can be performed with the power error of at most 6% or less, in both the area with the maximum recording sensitivity and the area with the minimum recording sensitivity. The multilayered optical disk according to the present invention has a recording power margin of about 13%, and hence the power error of 6% is permissible. However, when the recording method according to the present invention is not applied, the power error of 12% is caused so as to eliminate most of the margin, and thereby an error is caused by other stress, such as an inclination of the disk. Here, the methods for determining how many times of the power obtained in the test area is set as the recording power of the user area, includes a method in which the characteristics of respective layers are evaluated beforehand for each disk so as to be stored as a comparison table in the drive, and a method in which the characteristics are stored in the control data area of the disk. However, from a viewpoint of interchangeability, it is preferred to describe beforehand the characteristics in the control data area of the disk.

Embodiment 5

In the present embodiment, the method of using the test area is substantially the same as the method in the above described embodiment shown in FIG. 1C. That is, the recording block of the m-th layer, which block is located within the range of the radial distance L from the recorded block of the n-th layer, is determined as unsuitable for testing. In this case, it is assumed that the range of the radial distance L is dynamically defined.

In the case of the disk used in the present embodiment, the maximum value of the radial tolerance between the layers is 100 μm, and the maximum value of the relative run-out between the layers is 75 pin. The radius of the optical spot on the layer separated by the interlayer spacing d is expressed by $[d \times NA/n]/\{1-(NA/n)^2\}^{1/2}]$. Thus, in the disk of the present embodiment, in which the maximum value of the interlayer spacing is 50 μm, the spot diameter is 31 μm. Therefore, the sum of the radial error, the radial run-out, the beam diameter, which are defined by the range of physical specification values of the disk, is obtained as L=100 μm+75 μm+31 μm=206 μm. On the other hand, in the present embodiment, the value of 206 μm is not used as it is as the radial distance L, but the radial run-out and the interlayer spacing, which are actually measured by the optical disk drive, are used.

Figure 16:
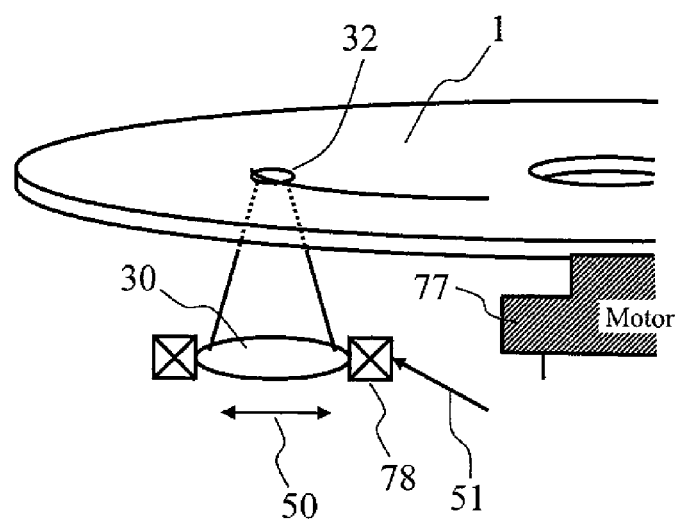
FIG. 16 is a figure showing a method for measuring the radial run-out in the recording apparatus according to the present invention.

An example of the method for measuring the radial run-out in the present embodiment will be described by using FIG. 16. In the case where the radial run-out is measured, a lens position 50 is measured at the time when after the light beam is focused on the measuring object layer, the optical spot 32 is made to follow the recording track of the measuring object layer by applying tracking servo. The lens position is obtained from lens driving current 51 applied to the actuator 78 for tracking. In the frequency band corresponding to the disk radial run-out, that is, the frequency band corresponding to the number of revolutions of the disk, the lens position is proportional to the lens drive current. Therefore, since the relationship between the lens drive current and the lens position is known beforehand from values unique to the drive, the lens position corresponding to the disk radial run-out can be obtained by measuring the lens driving current. Here, in order to accurately measure the radial run-out, it is recommended to stop the movement of the thread motor to move the entire head, or to perform processing in consideration of the movement amount of the head. The radial run-out of each of the layers can be obtained by performing the processing to each of the layers. The amount of relative run-out between two layers is given by averaging the peak-to-peak values of the radial run-out of each of the layers. In the case where the phase of the radial run-out of each of the layers can be measured, the relative run-out can be more accurately calculated by the vector subtraction in consideration of the amount and the direction of the radial run-out.

Figure 17:
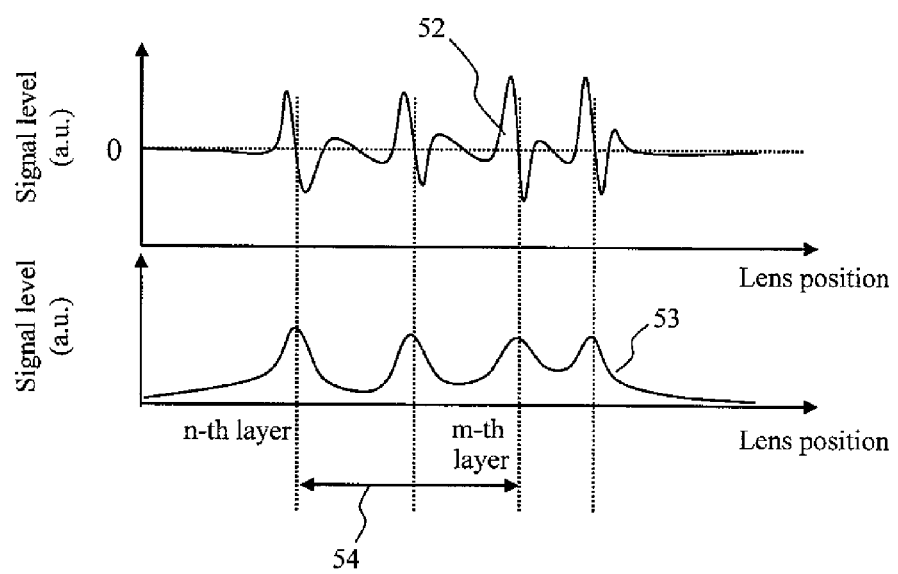
FIG. 17 is a figure showing a method for measuring the interlayer spacing in the recording apparatus according to the present invention.

The method for measuring the interlayer spacing will be described by using FIG. 17. The lens is swept in the focus direction by driving the focus actuator by a ramp waveform. While the lens is swept, the focus error signal 52 and the total light signal 53 are detected. The focus direction position of each of the layers is specified from the relationship between the two signals, so that the interlayer spacing 54 is obtained from the difference in the lens position. This interlayer spacing 54 is a distance in the case where the n-th layer and the m-layer are separate from each other by a distance of two layers. However, when the refractive index of the spacer between the layers is set to n, the relationship between the lens position and the interlayer spacing is expressed as the interlayer spacing=the lens position×n.

In this way, at the time of loading the disk, and the like, the relative run-out and interlayer spacing are measured. Further, on the basis of the measured values, the radial distance L=the relative radial error (specification range)+the relative run-out (measured value)+the light beam diameter (calculated value from the measured value) is calculated. Then, by configuring such that the test recording, such as the optimum power control, is not performed by using the test recording block within the range of the calculated radial distance L on the first recording layer, the test recording can be performed on the first recording layer without receiving the influence of recording in the test area of the second recording layer which is located on the side nearer to the light incident surface. In this case, methods of determining a recording block as unsuitable for testing includes methods, such as a method in which the determination is performed by comparing block addresses between a plurality of layers, a method of recording beforehand dummy data in the recording block unsuitable for testing, and a method of recording in a disk management area (TDDS), and the like, information indicating that the recording block is unsuitable for testing, or the start address of the recording block unsuitable for testing. It is preferred to combine a plurality of these methods from a viewpoint of the interchangeability between the drives. In the case where the block addresses between layers are compared with each other, and where the address starting point and the address expression method are different between the layers, the calculation needs to be performed in consideration of such differences.

In the present embodiment, the specification value of the disk is used as the relative radial error, but a measured value can also be as the relative radial error. The measurement of the relative radial error can be performed, for example, as follows. The drive of the thread motor for moving the entire head is stopped in the state where the head is made to follow an arbitrary track on the first layer. Then, while the lens driving signal is monitored, a recording block at which the DC component of the lens driving signal becomes zero is accessed. Next, in the state where the drive of the thread motor remains to be stopped, the head is moved to the second layer. Then, by applying tracking, a recording block at which the DC component of the lens driving signal becomes zero is accessed, while the lens driving signal is monitored. By comparing the addresses of the first and second layers obtained in this way, the relative radial position error can be calculated from the difference between the addresses. In the case where the address starting point and the address expression method are different between the layers, the calculation needs to be performed in consideration of such differences.

In the present embodiment, it is described that the radial distance L is dynamically determined. However, the radial distance may be determined for respective arbitrary cases, such as for respective recording layers, respective media, and respective combinations between the media and drives.

The effects of the present invention are not limited to the above described embodiments. For example, other than the recordable type recording layer, a rewritable type recording layer can also be used as the recording layer of the optical disk. In the case of the rewritable type recording layer, the accurate power may not be necessarily be obtained by the asymmetry and the β value, and hence it is preferred to use indexes, such as modulation amplitude, $\epsilon$, $\gamma$ and $\kappa$ as indexes of the recording power adjustment (OPC).

Further, it is effective that the scope of the present invention which limits the ratio of the recordable area can be applied not only to the test area but also to the disk management area in which recording management information, defect management information, and the like, are recorded. In this case, it is possible to record the management information with high quality and high reliability as compared with a common user information area, and hence there is an advantage that the reliability of recording in the entire disk is improved.

What is claimed is:

1. A method of performing test recording on an optical disk which has three or more recordable or rewritable information recording layers, comprising the steps of:
   performing a test recording in an arbitrary segment in a second test area in a second recording layer that is closer to a light incident surface than a first recording layer;
   identifying a segment in a first test area in the first recording layer which has a radial distance that is less than a predetermined radial distance L, which is based, in part, on predetermined parameters of the optical disk, from the recorded test area in the second test area; and
   setting the identified segment as a segment in which test recording is not performed, wherein the radial distance L is determined based on a manufacturing error of the optical disk.

2. The recording method of the multilayered optical disk according to claim 1, wherein a determination on whether or not the radial distance of the segment in the first test area is within the range of the predetermined radial distance L is performed by comparing the addresses of the segments with each other.

3. The recording method of the multilayered optical disk according to claim 1, wherein a range of the predetermined radial distance L is defined as a distance corresponding to the sum of a relative error of radial positions of the plurality of layers, a radial run-out of the plurality of layers, and an optical beam diameter.

4. The recording method of the multilayered optical disk according to claim 1, wherein the segments are formed by substantially bisecting the first recording area and the second recording area, respectively.

5. The recording method of the multilayered optical disk according to claim 1, wherein a size of each segment is set equal to a recording unit block size.

6. The recording method of the multilayered optical disk according to claim 1, wherein in at least a part of the segment in which the test recording is not performed, there is recorded dummy information indicating that the segment is the unusable area.

7. The recording method of the multilayered optical disk according to claim 1, further comprising a step of recording, in a specific area, information used for determining whether or not respective segments in the first test area can be used.

8. A method for performing test recording on a multilayered optical disk which has three or more recordable or rewritable information recording layers, comprising the steps of:
performing a test recording in an arbitrary recording unit block in a second test area in a second recording layer that is closer to a light incident surface than a first recording layer;
identifying a recording unit block in a first test area in the first recording layer which has a radial distance that is less than a predetermined distance L, which is based, in part, on predetermined parameters of the optical disk, from the recorded test area in the second test area; and
setting the identified recording unit block as a recording unit block in which test recording is not performed,
wherein the radial distance L is determined based on a manufacturing error of the optical disk.

9. The recording method of the multilayered optical disk according to claim 8, wherein the predetermined radial distance L is set to a distance corresponding to the sum of a relative error of radial positions of the plurality of layers, a relative run-out between the plurality of layers, and an optical beam diameter on layers other than a reading/writing target layer.

10. The recording method of the multilayered optical disk according to claim 9, wherein values defined by a predetermined range of physical specifications of the disk are used as a relative error of radial positions of the plurality of layers, the relative run-out between the plurality of layers, and the optical beam diameter on layers other than the reading/writing target layer.

11. The recording method of the multilayered optical disk according to claim 9, wherein the relative error of radial positions of the plurality of layers, the relative run-out between the plurality of layers, and the optical beam diameter on layers other than reading/writing target layer are defined by using either values defined by a range of physical specifications of the disk or values obtained by actually detecting the states of the disk.

12. A multilayered optical disk having three or more recordable or rewritable information recording layers, comprising:
a first recording layer including a first test area having a plurality of segments;
a second recording layer located on a side nearer to a light incident surface than the first recording layer, said second recording layer including a second test area having a plurality of segments;
an arbitrary segment in the second test area on which test-recording has been performed; and
a segment in the first test area that is set as a segment in which the test recording is not performed,
wherein the set segment has a radial distance from the arbitrary segment that is less than a predetermined radial distance L, and
wherein the radial distance L is determined based on a manufacturing error of the optical disk.

13. An information reproduction method for reproducing information recorded on a multilayered optical disk having three or more recordable or rewritable information recording layers, comprising:
determining whether an arbitrary segment in a second test area in a second recording layer is test-recorded, the second recording layer being located on a side nearer to a light incident surface than a first recording layer; and
setting a segment in a first test area in the first recording layer as a segment in which test recording is not performed,
wherein the set segment has a radial distance from the arbitrary segment that is less than a predetermined radial distance L, and
wherein the radial distance L is determined based on a manufacturing error of the optical disk.

* * * * *